N. WHITE.
ZERO SETTING MECHANISM.
APPLICATION FILED OCT. 23, 1920.

1,396,612.

Patented Nov. 8, 1921.
3 SHEETS—SHEET 2.

Inventor
Nelson White,

N. WHITE.
ZERO SETTING MECHANISM.
APPLICATION FILED OCT. 23, 1920.
1,396,612.
Patented Nov. 8, 1921.
3 SHEETS—SHEET 3.
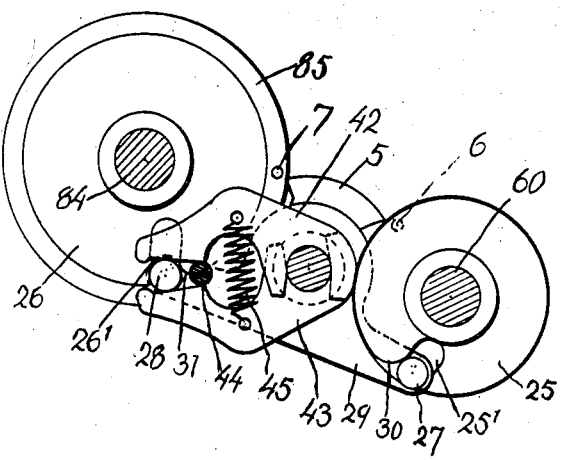
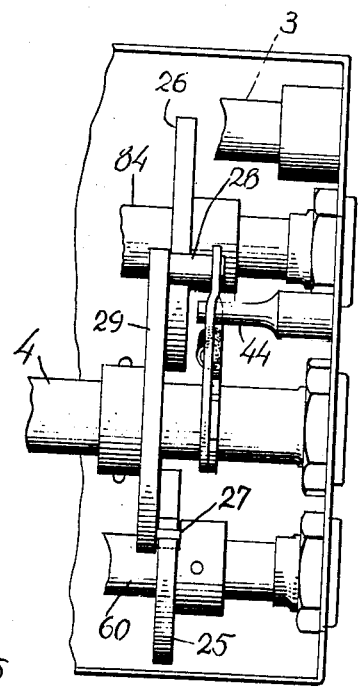
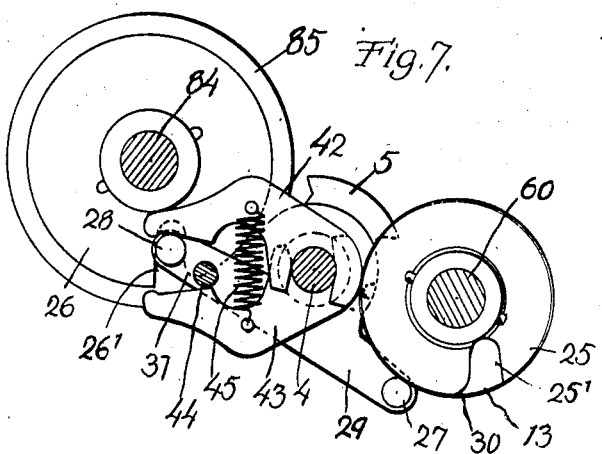
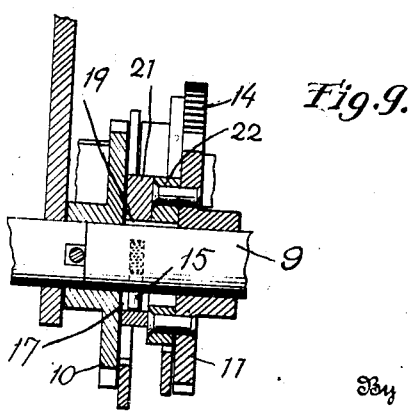
Inventor
Nelson White.
E. M. Anderson Son
By
Attorney

UNITED STATES PATENT OFFICE.

NELSON WHITE, OF DES MOINES, IOWA, ASSIGNOR TO MONROE CALCULATING MACHINE COMPANY, OF NEW YORK, N. Y., A CORPORATION OF NEW YORK.

ZERO-SETTING MECHANISM.

1,396,612.  Specification of Letters Patent.  Patented Nov. 8, 1921.

Application filed October 23, 1920. Serial No. 419,026.

*To all whom it may concern:*

Be it known that I, NELSON WHITE, a citizen of the United States, resident of Des Moines, in the county of Polk and State of Iowa, have made a certain new and useful Invention in Zero-Setting Mechanism; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Fig. 6 is an enlarged section, on the line 6—6, Fig. 1, the parts being shown in normal position.

Fig. 7 is a similar view, with the front numeral wheel shaft rotated.

Fig. 8 is an enlarged bottom plan view of the left-hand end of the carriage and parts mounted therein.

Fig. 9 is a detail sectional view of the clutch-carrying gears.

Figure 1:
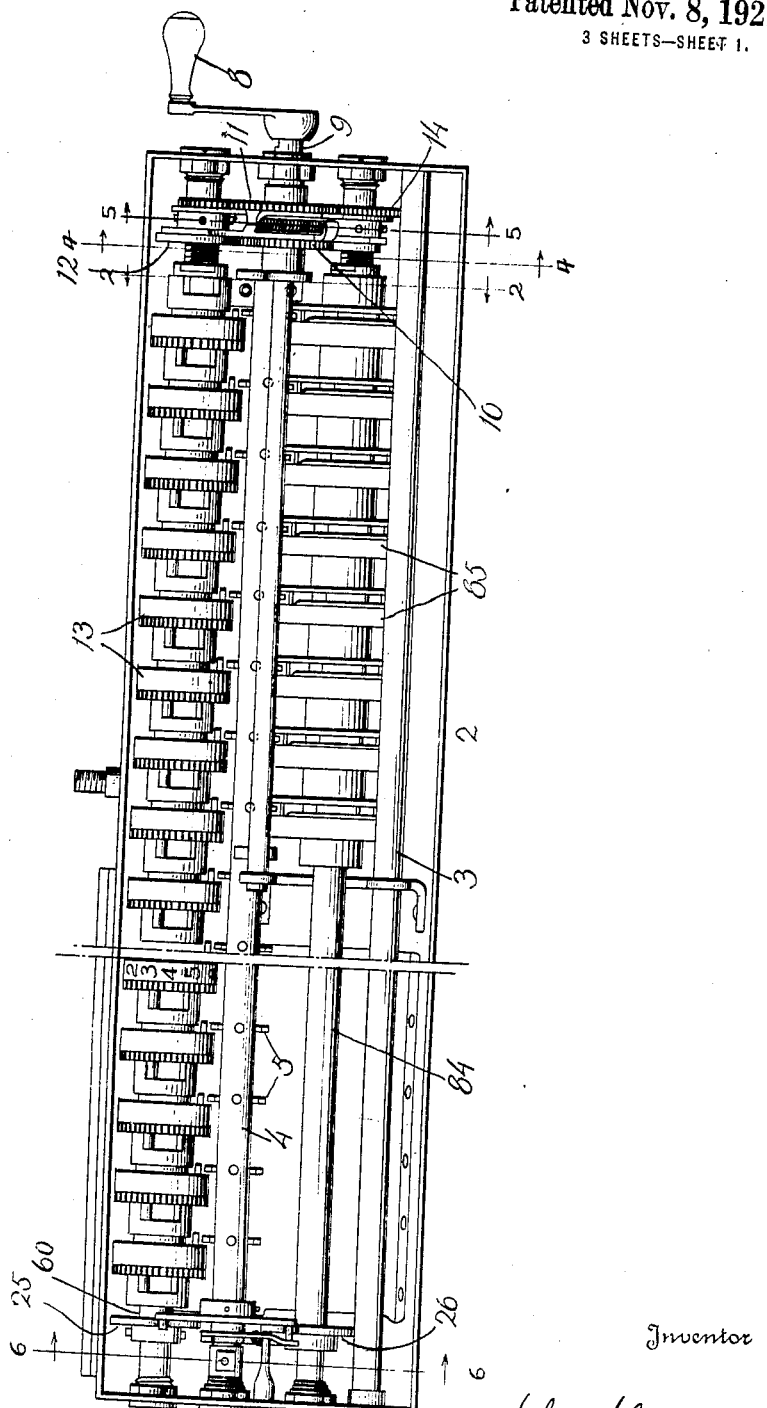
Figure 1 is a bottom plan view of the carriage of a calculating machine embodying the invention.
Figure 2:
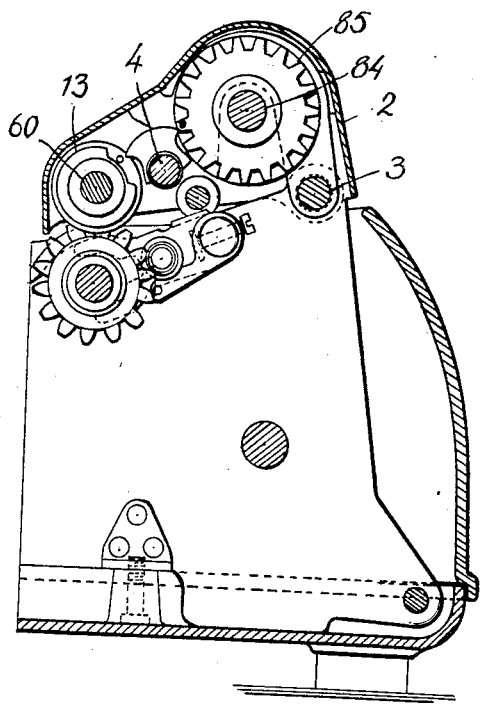
Fig. 2 is a section on the line 2—2, Fig. 1, the rear portion of the main frame of the machine being shown, with parts mounted therein, the parts being shown in normal position.
Figure 3:
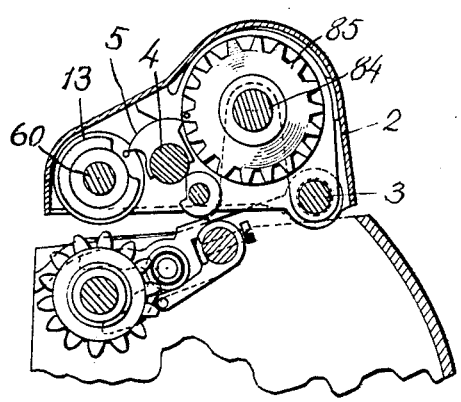
Fig. 3 is a similar view, with the carriage raised to disengage the gears.
Figure 4:
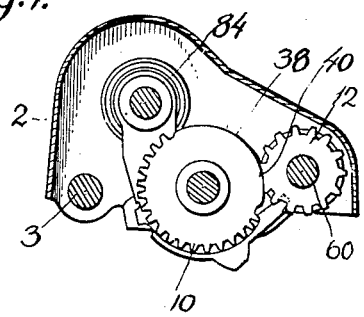
Fig. 4 is a section on the line 4—4, Fig. 1.
Figure 5:
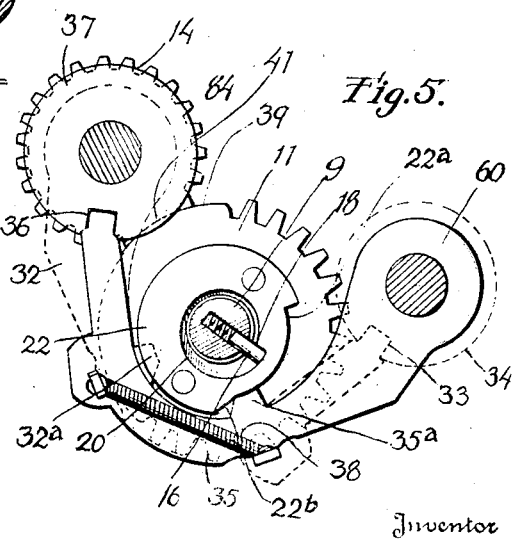
Fig. 5 is an enlarged section, on the line 5—5, Fig. 1.

The invention has relation to zero-setting means for calculating and other machines, having for an object certain improvements upon the disclosure of the patent to Baldwin, No. 1,275,119, dated August 6, 1918.

The invention consists in the novel construction and combinations of parts, as hereinafter set forth.

In the accompanying drawings illustrating an embodiment of the invention, the numeral 2 designated the endwise shiftable carriage, pivoted in rear at 3, and having mounted thereon a series of numeral wheels 13, and a parallel series of numeral wheels 85; a rod or bar 4 being located between and parallel to the two series of numeral wheels and having a series of radial projections 5, 5 spaced apart and normally located without the path of movement of pins 6 and 7 of said wheels, said bar having bearings in the carriage frame and being capable of being rocked to one side or the other to bring said projections first within the path of movement of the pins of one series of wheels, as 13, and as the bar is oppositely rocked out of the path of movement of the pins of said wheels, and within the path of movement of the pins of the other series of wheels.

An operating device or crank handle 8, is carried by a rotary shaft 9, said shaft having driving connection with the shafts 60 and 84 of the two series of number wheels, and being adapted upon rotation of the handle in one direction to rotate one series of said wheels and upon rotation of the handle in the opposite direction to rotate the other series of wheels, by means of two gears 10 and 11 upon the shaft 9, said gears having driving engagement with gears 12 and 14 of the shafts 60 and 84, and having respectively oppositely acting clutch connections with the shaft 9, including spring pressed pins 15 and 16 of shaft 9, and shoulders 17 and 18 of the gears 10 and 11, said shoulders having inclined approaches 19 and 20, all as shown in said patent, excepting that in the present case the shoulders 17 and 18 and the inclined approaches thereto form part of members or disks 21 and 22 suitably made fast to said gears.

The shaft 60 is normally locked or held against rotation by a rigid arm 32, pivoted upon the shaft 84, and at its free end engaging a peripheral notch 33, of a plate or disk 34, secured to the gear 12; and the shaft 84 is normally held against rotation by a similar rigid arm 35, pivoted at one end upon shaft 60, and at its free end engaging a peripheral notch 36, of a plate or disk 37 secured to the gear 14, a coiled spring 38, connecting the arms 32 and 35, and being tensioned to maintain the normal engagement stated, and further tensioned in the release of the arms as stated hereinafter.

The disks 21 and 22 are provided with recesses 21ª, 22ª, and with cam proportions 21ᵇ, 22ᵇ, and the arms 32 and 35 are provided each with a tooth 32ª and 35ª, normally engaging the recesses and adapted respectively to be engaged by the respective cam portion in the rotation of the gear 10 or 11, according to the direction of movement of the crank handle, to thereby release the arm 32 or 35, and further tension said spring as stated, in the initial movement of the crank handle in either direction, said arm being held outwardly in released position by said cam during the rotation of said handle, and automatically restored to normal position at the end of said rotation.

The gears 10 and 11 are mutilated, having arcuate concentric convex untoothed portions 38 and 39, engaging similar but concave portions 40 and 41, of the gears 12 and 14 during the first portion or initial rotation of the crank handle or while the unlocking of the shaft 60 or 84 is being effected, and whereby the gears 12 and 14 will be held against rotary movement, this being also shown in the patent.

Means are provided (shown in the patent) to rock the bar 4 at the start of the rotation of the shaft 60 or 84 for the purpose stated, said means consisting of a cam 25 upon the shaft 60 and a cam 26 upon the shaft 84, the cams having each a peripheral notch 25', 26', wherein lie normally pins 27, 28, located at opposite ends of a cross arm 29 fast upon the shaft 4. As the shaft 60 or 84 starts to rotate in the movement of the crank handle, the cam upon the shaft will rotate therewith, the beveled wall 30 or 31 of the respective notch acting upon the related pin to rock the cross arm and the bar 4, the pin at the other end of the cross arm being thereby caused to enter farther into the notch of the other cam, and the pin engaged by said wall being moved from the notch and riding upon the circumferential surface of the cam until a complete rotation of the shaft 60 or 84 is effected, when the cross arm and the bar 4 will be rocked reversely to normal position to reëngage the pin with its related notch, under the influence of the improved means now to be described.

This improved means consists of two rigid arms 42 and 43, pivoted at one end thereof upon the bar 4, and straddling a stop device or bar 44 of the framing, being held in engagement with said stop bar by a coiled spring 45, connecting said arms, the free end portions of said arms also normally straddling the pin 28, as shown in Fig. 6 of the drawings, whereby as said pin is rocked farther into its notch, as shown in Fig. 7 of the drawings, it will raise the arm 42, and put the spring 45 under increased tension, holding said arm raised during the rotation of the shaft 60, said spring acting to restore the bar 4 to normal position at the end of a complete rotation of said shaft as stated.

In the rotation of the other shaft, 84, the bar will be oppositely rocked, and the lower arm 43, will be depressed, the spring 45 being similarly tensioned, and the action being otherwise as stated.

The arms 32 and 35 are arranged between the gears 10 and 11, and the movement thereof stated is vertical, whereby compactness of assembly is provided for, and the arms being rigid their engagement with the notched disks is more secure and accomplished with less strain on the parts than with the device of the patent. Also one spring serves for both arms.

The arms 42 and 43 are arranged centrally of the carriage at one end thereof and also provide for compactness of assembly, and these arms being rigid and connected by a coiled spring, their operation is more reliable than is the device of the patent. The invention does away with the use of flat or plate springs, which are not as efficient as coiled springs.

I claim:—

1. Means for holding either of two shafts against rotation during the rotation of the other shaft, consisting of a member fast to each shaft and having a seat, pivotal arms having normal engagement with the seats, a spring connecting said arms and maintaining said engagement, and operating means movable in one direction to rotate one of said shafts and in another direction to rotate the other of said shafts and adapted in its initial movement to release one or the other of said arms prior to rotating the related shaft and against the tension of said spring.

2. Means for holding either of two shafts against rotation during the rotation of the other shaft, consisting of a member fast to each shaft and having a seat, rigid arms each pivoted upon one of said shafts and having at its free end normal engagement with the seat of the member of the other shaft, a spring connecting said arms and maintaining said engagement, and operating means movable in one direction to rotate one of said shafts and in another direction to rotate the other of said shafts and adapted in its initial movement to release one or the other of said arms prior to rotating the related shaft and against the tension of said spring.

3. Means for holding either of two shafts against rotation during the rotation of the other shaft, consisting of a member fast to each shaft and having a peripheral notch, rigid arms each pivoted upon one of said shafts and having at its free end normal engagement with the notch of the member of the other shaft, said arms having their pivotal movement in vertical planes, a spring connecting said arms and maintaining said engagement, and operating means movable in one direction to rotate one of said shafts and in another direction to rotate the other of said shafts and adapted in its initial movement to release one or the other of said arms prior to rotating the related shaft and against the tension of said spring.

4. Means for holding a rockable member in normal position and for restoring it to normal position upon rocking movement thereof in either direction, consisting of a stop, two pivotal arms located upon opposite sides of and contacting with said stop, a spring connecting said arms, and a crank arm fast upon said member and having a pin located between said arms and adapted in the rocking of said member in one direction or the other to move one or the other of said arms against the tension of said spring.

5. Means for holding a rockable member in normal position and for restoring it to normal position upon movement thereof in either direction, consisting of a stop, two horizontally pivoted vertically movable arms located upon opposite sides of and contacting with said stop, a coiled spring connecting said arms, and a crank arm fast upon said member and having a pin located between said arms and adapted to move one or the other arm against the tension of said spring in the movement of said member in one or the other direction.

In testimony whereof I affix my signature in presence of two witnesses.

NELSON WHITE.

Witnesses:
 ADELE SHERMAN,
 RAY DAUGHERTY.